(12) United States Patent
Choi et al.

(10) Patent No.: US 11,099,386 B1
(45) Date of Patent: Aug. 24, 2021

(54) DISPLAY DEVICE WITH OPTICAL COMBINER

(71) Applicant: Apple Inc., Cupertino, CA (US)

(72) Inventors: Hyungryul Choi, San Jose, CA (US); Lei Zhao, Santa Clara, CA (US); Chaohao Wang, Sunnyvale, CA (US); Enkhamgalan Dorjgotov, Mountain View, CA (US); Shih-Chyuan Fan Jiang, San Jose, CA (US); Zhibing Ge, Los Altos, CA (US); Graham B. Myhre, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/283,550

(22) Filed: Feb. 22, 2019

Related U.S. Application Data

(60) Provisional application No. 62/637,260, filed on Mar. 1, 2018.

(51) Int. Cl.
*G02B 27/01* (2006.01)
*G02F 1/1335* (2006.01)
*G02F 1/1343* (2006.01)
*G02F 1/1337* (2006.01)

(52) U.S. Cl.
CPC ..... *G02B 27/0172* (2013.01); *G02F 1/13439* (2013.01); *G02F 1/133536* (2013.01); *G02B 2027/0118* (2013.01); *G02F 1/133548* (2021.01); *G02F 1/133723* (2013.01)

(58) Field of Classification Search
CPC ........ G02B 27/0172; G02B 2027/0118; G02F 1/133536; G02F 1/13439; G02F 1/133723; G02F 2001/133548
See application file for complete search history.

(56) References Cited

U.S. PATENT DOCUMENTS

| | | |
|---|---|---|
| 8,467,133 B2 | 6/2013 | Miller |
| 9,366,867 B2 | 6/2016 | Border et al. |
| 2011/0018903 A1 | 1/2011 | Lapstun et al. |
| (Continued) | | |

OTHER PUBLICATIONS

Leswing, 2 USC seniors walked into Sequoia Capital with a fishbowl and walked out with $1.5 million, Business Insider, 2017, 9 pages.

*Primary Examiner* — Nathanael R Briggs
(74) *Attorney, Agent, or Firm* — Treyz Law Group, P.C.; G. Victor Treyz; Tianyi He

(57) ABSTRACT

An optical system may include equipment with a housing that is configured to receive external equipment such as a cellular telephone. The external equipment may have a display mounted on a front face of the external equipment and may have additional components such as a front-facing camera. Communications circuitry in the equipment may support wired and wireless communications with the external equipment. An optical combiner in the equipment may be used to combine display image light emitted from pixels in the display with real-world image light received from external objects. The optical combiner may have a reflector with a concave lens shape that focuses light from the display towards eye boxes in which a viewer's eyes are located. The reflector may be a partial mirror or a reflective polarizer. The reflective polarizer and additional components may be used in implementing a tunable tint layer.

21 Claims, 9 Drawing Sheets

(56) References Cited

U.S. PATENT DOCUMENTS

| | | |
|---|---|---|
| 2016/0015470 A1 | 1/2016 | Border |
| 2016/0091970 A1 | 3/2016 | Fan |
| 2016/0266389 A1* | 9/2016 | Ouderkirk ................ G02B 5/30 |
| 2019/0114950 A1* | 4/2019 | Calm ................... G09G 3/3696 |

* cited by examiner

DISPLAY DEVICE WITH OPTICAL COMBINER

This application claims priority to U.S. provisional patent application No. 62/637,260 filed Mar. 1, 2018, which is hereby incorporated by reference herein in its entirety.

FIELD

This relates generally to optical systems, and, more particularly, to optical systems with optical combiners.

BACKGROUND

Optical systems may be used to provide images to a viewer. In some optical systems, it is desirable for both computer-generated and real-world images to be viewed simultaneously. In this type of system, an optical combiner can be used to merge image light from a display with real-world image light. If care is not taken, however, stray light reflections in an optical combiner or excessive light from an external object can adversely affect system performance.

SUMMARY

An optical system may include equipment with a housing that is configured to receive external equipment such as a cellular telephone. The housing may be a head-mountable housing.

The external equipment may have a display mounted on a front face of the external equipment and may have additional components such as a front-facing camera. Communications circuitry in the equipment may support wired and wireless communications with the external equipment.

An optical combiner in the equipment may be used to combine display image light emitted from pixels in the display with real-world image light received from external objects. The optical combiner may have a reflector with a concave lens shape that redirects and focuses light from the display towards eye boxes in which a viewer's eyes are located.

With one arrangement, the reflector may be a partial mirror. An optical component such as a circular polarizer may overlap the front-facing camera without overlapping the display on the front face of the cellular telephone to suppress stray light reflections from the display into the front-facing camera.

With another arrangement, the reflector may be a reflective polarizer. The reflective polarizer and additional components such as layers of electrodes, additional polarizer layers, and a liquid crystal layer may be used in implementing a tunable tint layer.

DETAILED DESCRIPTION

Optical systems may be used to present images to a user. In some mixed reality systems, displays present computer-generated content that is overlaid on top of real-world images. An optical system may use an optical combiner to combine light from real-world images with image light from a display. The optical combiner may include a tunable tint layer. The tunable tint layer may be used to selectively adjust the amount of real-world image light that is passing to a viewer relative to the computer-generated (virtual reality) content from the display.

Figure 1:
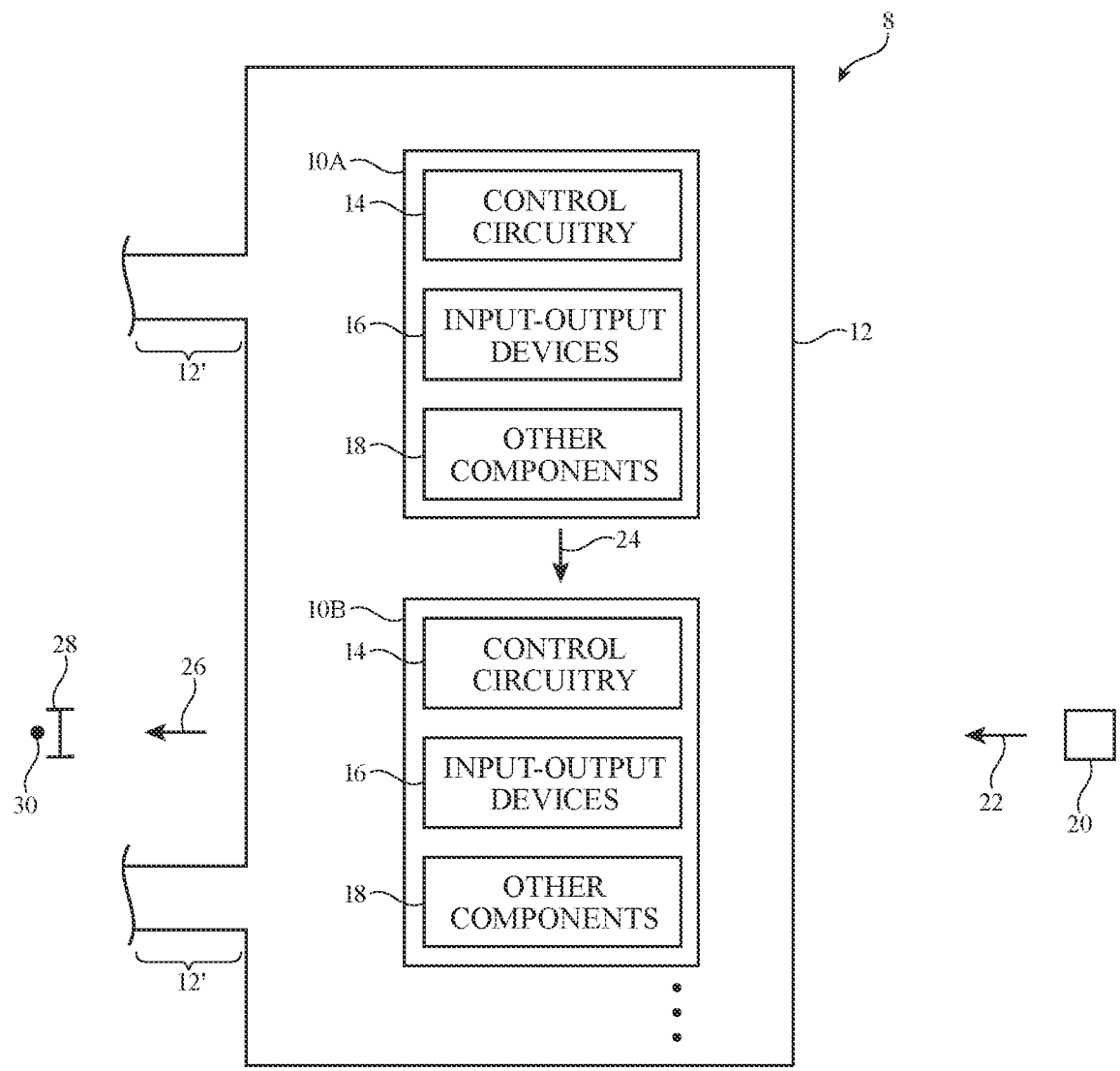
FIG. 1 is a diagram of an illustrative optical system in accordance with an embodiment.

An illustrative optical system is shown in FIG. 1. As shown in FIG. 1, optical system 8 may include equipment 10A and 10B. Equipment 10A may be, for example, a portable electronic device such as a cellular telephone. Equipment 10B may be a head-mounted device with an optical combiner. In some configurations, the components of equipment 10A and 10B may be formed as an integral unit. In other configurations, equipment 10B may serve as a support structure for equipment 10A. With this type of arrangement, equipment 10A may be used in conjunction with equipment 10B or may be used separately. Configurations for system 8 in which system 8 includes removable equipment 10A may sometimes be described herein as an example.

In the illustrative arrangement of FIG. 1, system 8 includes a support structure such as housing 12. Housing 12 may be formed from glass, polymer, metal, fabric, natural materials, ceramic, and/or other materials. Housing 12 may be configured to be worn on the head of a user. For example, housing 12 may have head-mounted portions 12' that are configured to form head-mountable support structures such as straps, helmet support structures, portions of a hat, goggles, or glasses, etc. Housing 12 may be formed as part of equipment 10B and may be configured to receive equipment 10A when it is desired to support equipment 10A during use of system 8. Housing 12 may, as an example, have portions forming a recess that receives equipment 10A and holds equipment 10A in place while equipment 10A is presenting computer-generated images on a display in equipment 10A.

Equipment 10A and/or 10B may include components such as control circuitry 14, input-output devices 16, and other components 18. Control circuitry 14 may include storage such as hard-disk storage, volatile and non-volatile memory, electrically programmable storage for forming a solid-state drive, and other memory. Control circuitry 14 may also include one or more microprocessors, microcontrollers, digital signal processors, graphics processors, baseband processors, application-specific integrated circuits, and other processing circuitry. Communications circuits in circuitry 14 may be used to transmit and receive data (e.g., wirelessly and/or over wired paths). This allows equipment 10A and 10B to communicate wirelessly and/or over a wired connection between equipment 10A and 10B. The communications circuits of circuitry 14 may also be used to support wired and/or wireless circuitry with external equipment (e.g., remote controls, host computers, on-line content servers, etc.).

In some arrangements, control circuitry 14 in equipment 10A and/or 10B may use a display in equipment 10A to display images. These images, which may sometimes be referred to as computer-generated content or computer-generated images, may be associated with a virtual world, may include pre-recorded video for a movie or other media, or may include other images. Image light 24 (display image light) from computer-generated images in equipment 10A may be provided to equipment 10B (e.g., through free space). Equipment 10B may include an optical combiner. The optical combiner may combine real-world image light 22 associated with real-world images of real-world objects 20 with display image light 24 associated with computer-generated (non-real-world) images, thereby producing merged image light 26 for viewing by viewer (viewer eye) 30 in eye box 28. System 8 may have two associated eye boxes 28 for providing images to a user's left and right eyes.

Input-output devices 16 in equipment 10A and/or 10B may be coupled to control circuitry 14 in equipment 10A and/or 10B. Input-output devices 16 may be used to gather user input from a user, may be used to make measurements on the environment surrounding device 10, may be used to provide output to a user, and/or may be used to supply output to external electronic equipment. Input-output devices 16 may include buttons, joysticks, keypads, keyboard keys, touch sensors, track pads, displays, touch screen displays, microphones, speakers, light-emitting diodes and/or lasers for providing a user with visual output, and sensors (e.g., force sensors, temperature sensors, magnetic sensor, accelerometers, gyroscopes, and/or other sensors for measuring orientation, position, and/or movement of system 8, proximity sensors, capacitive touch sensors, strain gauges, gas sensors, pressure sensors, ambient light sensors, and/or other sensors). Devices 16 can include cameras (digital image sensors) for capturing images of the user's surroundings, cameras for performing gaze detection operations by viewing eyes 30, and/or other cameras. For example, input-output devices 16 may include one or more cameras for producing data that is fused with data from an inertial measurement unit having an accelerometer, compass, and/or gyroscope for implementing a visual inertial odometry system). Devices 16 may also include depth sensors (e.g., sensors using structured light and/or using binocular cameras). In some configurations, light-based and/or radio-frequency-based sensors may be used for external object tracking (e.g., lidar, radar, and/or other detection and ranging applications).

Equipment 10A and/or 10B may also include other components 18. Components 18 may include batteries for powering the electrical components of equipment 10A and/or 10B, optical components, and/or other devices. To combine display image light 24 from a display in equipment 10A with real-world image light 22 to produce merged light 26, components 18 in equipment 10B may include an optical combiner. The optical combiner may be passive (e.g., a partially reflective mirror combiner) and/or may include one or more adjustable components (e.g., a tunable tint layer, sometimes referred to as an adjustable light modulator or adjustable light absorbing layer). Adjustable optical components in the optical combiner may impart global changes to light 22 (e.g., a global change in light intensity) and/or may be two-dimensional components (e.g., pixelated components) that can impart changes in particular regions of the optical combiner (e.g., localized increases in light absorption). This allows real-world image light 22 to be locally dimmed (as an example) to help reduce external light intensity when virtual objects in image light 24 are being overlaid on portions of a real-world scene.

Figure 2:
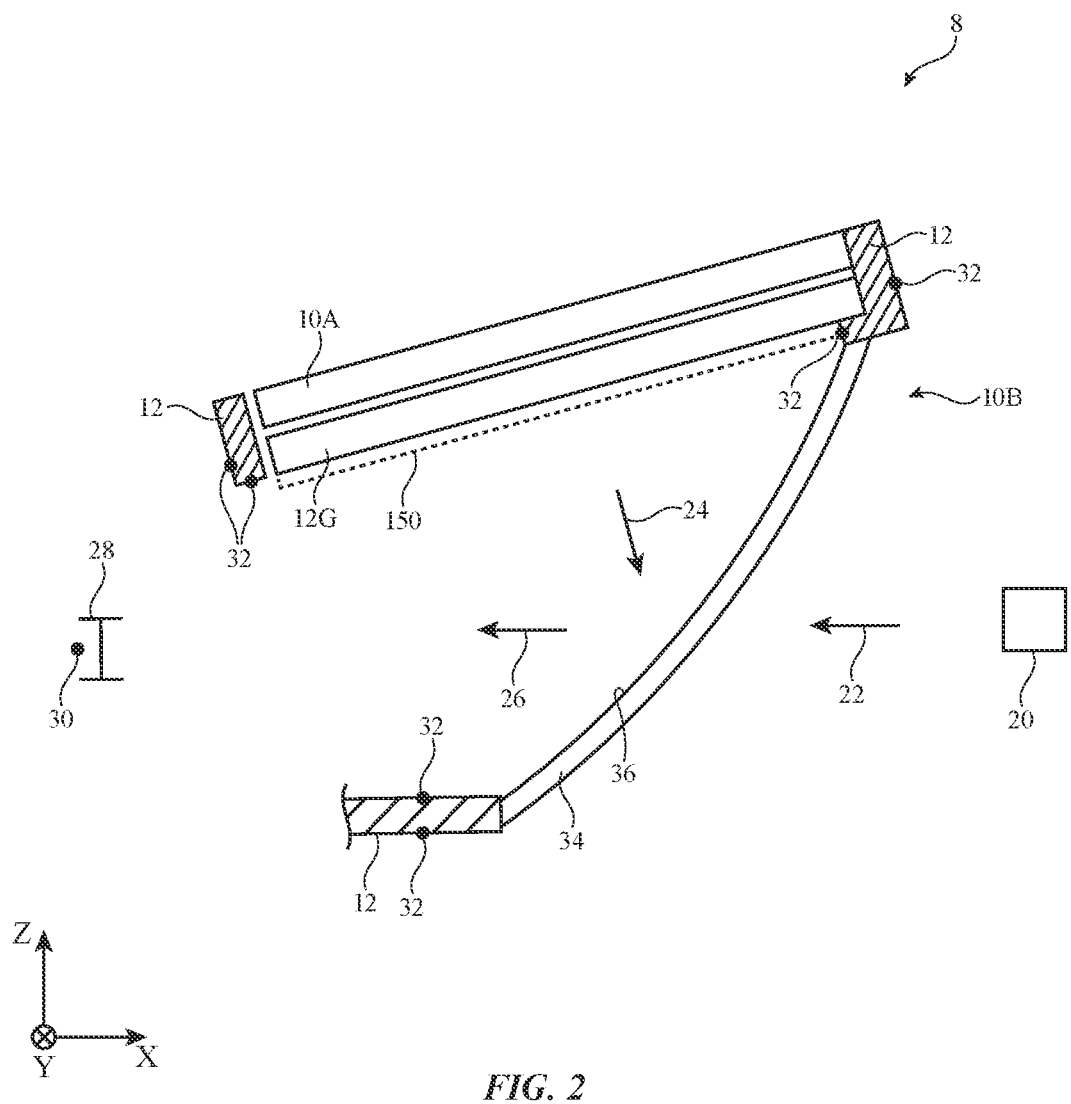
FIG. 2 is a cross-sectional side view of an illustrative optical system in accordance with an embodiment.

A cross-sectional side view of system 8 in an illustrative configuration in which housing 12 of equipment 10B serves as head-mounted support structures for receiving a removable device (equipment 10A) is shown in FIG. 2. Equipment 10B includes optical combiner 34. Combiner 34 has a curved shape (see, e.g., curved inner surface such as concave lens shaped surface 36) and includes a reflective layer that has a corresponding concave lens shape. The reflective layer may be a partially reflective mirror, a reflective polarizer, or other reflective structures for reflecting light 24 towards eye box 28 and eye 30. The reflective layer may be formed in a curved shape (e.g., on curved inner surface 26) to form a concave lens shape that allows the reflective layer to form a reflective lens that focuses images displayed on the display of equipment 10A for viewing by user's eye(s) 30. At the same time, combiner 34 passes real-world image light 22 to eye 30 without significant distortion so that the user may view real-world objects such as external object 20.

Input-output components 16 (e.g., a gaze tracking system, a front-facing or side-facing camera, a camera in visual odometry circuitry, depth sensors and other sensors, etc.) can be mounted in one or more locations on housing 12 such as locations 32 and may point towards eye 30, external object 20 and/or other external and/or internal directions. Housing 12 may, if desired, have a transparent portion such as portion 12G (e.g., a planar layer of glass, transparent polymer, etc.) that receives the front face (and display) of equipment 10A when equipment 10A is received within equipment 10B. One or more coatings or other optical layers may be formed on all or part of a transparent substrate in portion 12G.

Figure 3:
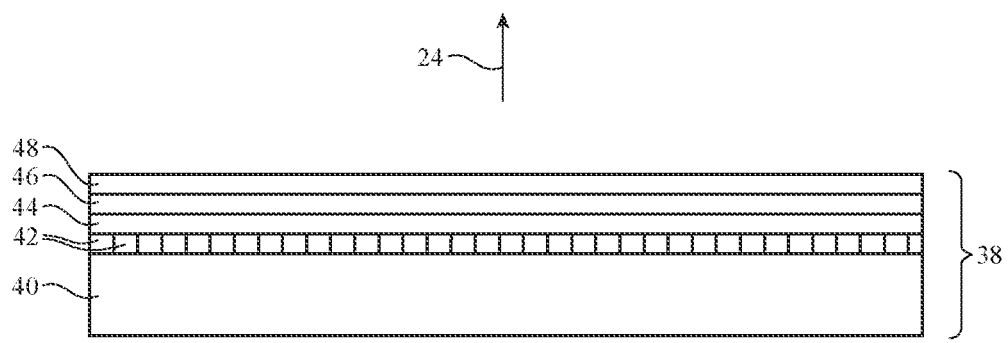
FIG. 3 is a cross-sectional side view of an illustrative display in accordance with an embodiment.

FIG. 3 is a cross-sectional side view of an illustrative display for system 8. Display 38 may be a liquid crystal display, an organic light-emitting diode display or other light-emitting diode display, a liquid crystal-on-silicon display, a microelectromechanical systems (MEMS) display, and electrophoretic display, and/or other suitable display. Display 38 may include one or more support structures such as substrate 40. An array of pixels 42 may be formed on substrate 40 to form a display. The display may emit display images (e.g., computer-generated content) based on information from control circuitry 14.

Optical layers such as layers 44, 46, 48, and/or additional layers may be formed on pixels 42 (e.g., as coating layers that overlap pixels 42). With one illustrative configuration, layer 44 is a wave plate such as a quarter wave plate and layer 46 is a linear polarizer. Together, layer 44 and layer 46 form a circular polarizer that helps suppress ambient light reflections from reflective structures in pixels 42. Layer 48 may be a wave plate such as a quarter wave plate. Emitted display image light from pixels 42 is linearly polarized upon passing through linear polarizer layer 46. After passing through quarter wave plate layer 48, this linearly polarized image light 24 may become circularly polarized (e.g., to enhance compatibility with users wearing polarized sunglasses).

Some configurations for system 8 include antireflection coatings and other layers formed from a stack of dielectric films (sometimes referred to as thin-film interference filters).

Figure 4:
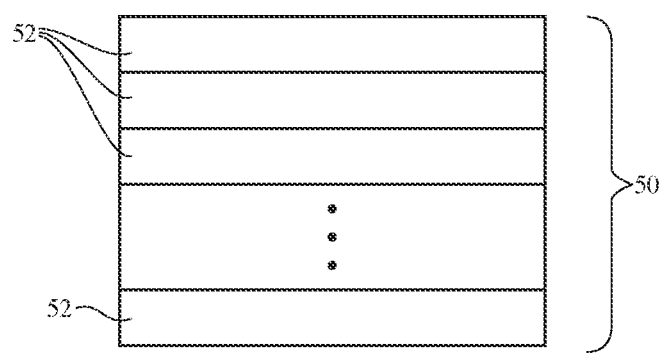
FIG. 4 is a cross-sectional side view of an illustrative stack of dielectric layers in accordance with an embodiment.

An illustrative dielectric stack is shown in FIG. 4. As shown in FIG. 4, dielectric stack 50 includes a stack of dielectric layers 52. Layers 52 may be organic layers (e.g., polymer layers) and/or inorganic dielectric layers (e.g., metal oxides such as titanium oxide, niobium oxide, tantalum oxide, aluminum oxide, zinc oxide, other inorganic layers such as a silicon oxide layer, a silicon oxynitride layer, a nitride layer such as a silicon nitride layer, etc.). Layers 52 may have alternating refractive index values (e.g., to form a thin-film filter that serves as a partial mirror or an antireflection coating). In some optical components (e.g., a reflective polarizer film used as a reflective layer in optical combiner 34), layers 52 may include birefringent films (e.g., stretched polymer films) that alternate with non-birefringent dielectric layers 52.

Figure 5:
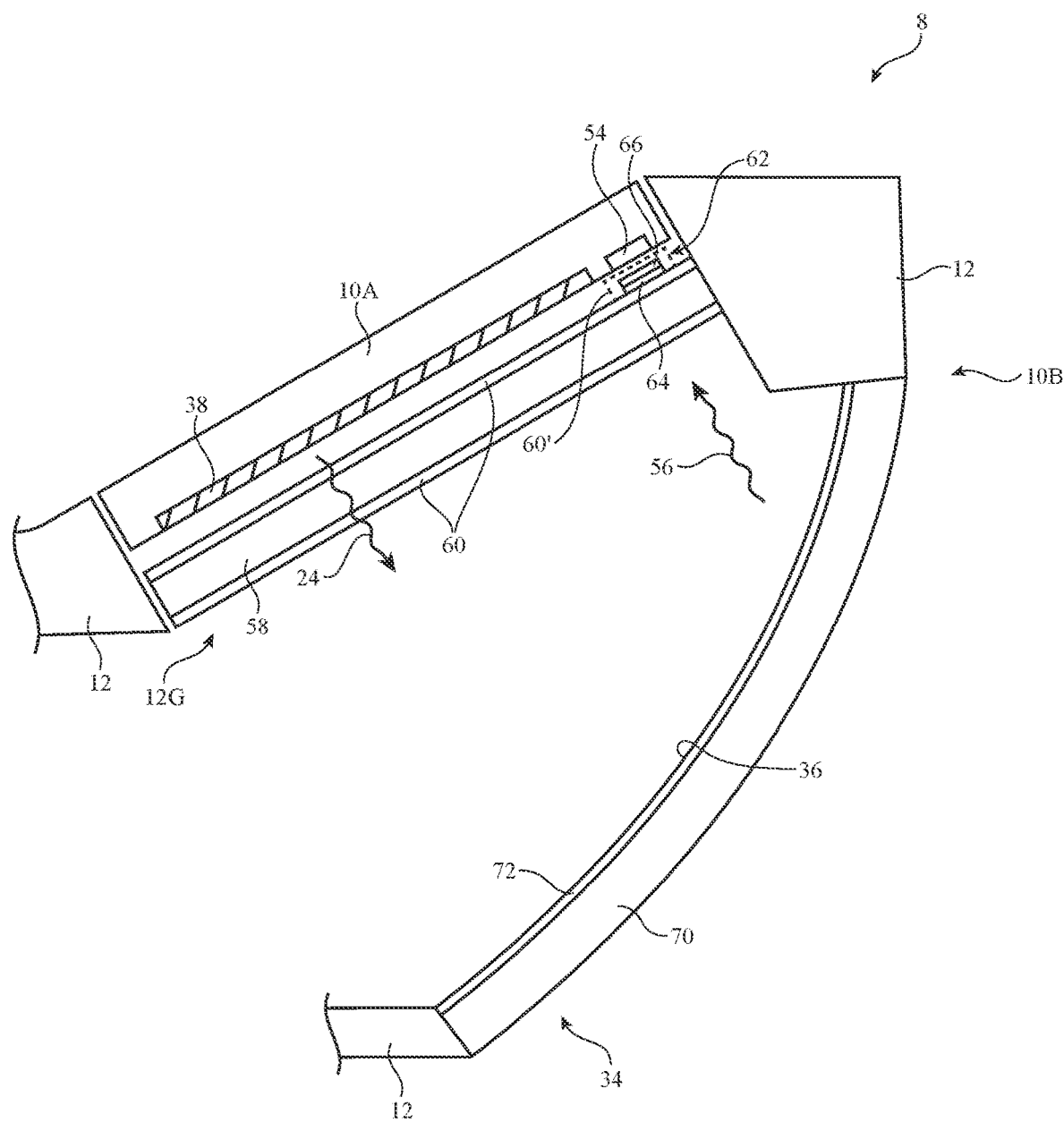
FIG. 5 is a cross-sectional side view of an illustrative optical system in accordance with an embodiment.

FIG. 5 is a cross-sectional side view of system 8 in an illustrative configuration in which optical combiner 34 includes a substrate such as substrate 70 having a concave-lens-shaped inner surface that supports a reflective layer such as partially reflective mirror layer 72. The reflectively of mirror layer 72 may be, for example, about 10%-90%, 30-70%, 40-60%, or other suitable non-negligible reflectivity value that helps reflect light from display 38 towards the eye of a user while exhibiting non-negligible transmission (e.g., 10-90%, 30-70%, 40-60%, or other suitable non-negligible light transmission value) that helps transmit light from real-world objects towards the eye of a user. Mirror layer 72 may be formed from a thin metal layer, a dielectric stack such as stack 50 (e.g., a thin-film interference filter configured to form a partial mirror), or other reflective layer that is relatively polarization insensitive (as an example).

Transparent portion 12G of housing 12 may have a transparent substrate such as substrate 58 that partially or fully overlaps display 38 on the front face of equipment 10A (e.g., the front face of a cellular telephone or other portable electronic device). Substrate 58, which may be formed from transparent glass, transparent polymer, or other transparent material, may help support equipment 10A when equipment 10A is coupled to equipment 10B. A front-facing camera such as camera 54 in equipment 10A may capture images of external objects through combiner 34. To suppress reflections of stray light 24 emitted by display 38, a circular polarizer such as circular polarizer 62 may be provided on portion 12G of housing 12 (e.g., on substrate 58) in a location that overlaps front-facing camera 54 without overlapping display 38. Antireflection coating layers 60 formed from dielectric stacks (e.g., thin-film interference filters including stacks 50 of layers 52 of FIG. 4) may be formed on one or both sides of substrate 58. As shown by optional coating layer 60', an antireflection coating layer may be formed over circular polarizer 62.

During operation, display 38 emits image light 24 that is reflected from a reflective layer on concave lens surface 36 of combiner 34 such as mirror layer 72 towards the user's eyes. Display 38 may also emit stray light 24 (e.g., light emitted at oblique angles that is not reflected towards the user's eyes by mirror layer 72). This stray light 24, which may be circularly polarized as described in connection with emitted light 24 of FIG. 3, may be reflected towards front-facing camera 54 from mirror 72 as circularly polarized stray light 56. Unless suppressed, these stray light reflections will tend to interfere with the operation of camera 54.

Circular polarizer 62 may include layers such as wave plate 64 (e.g., a birefringent layer of dielectric) and linear polarizer 66. Wave plate 64 is configured to convert circularly polarized stray light 56 to linearly polarized light. Linear polarizer 66 is configured with a pass axis that is orthogonal to the polarization axis of this linearly polarized light. As a result, polarizer 66 will absorb the reflected stray light 56 after the reflected stray light has been converted to a linearly polarized state by quarter wave plate 64. Unpolarized light (e.g., light 22 from external objects 20) passes through combiner 34 and wave plate 64 without becoming linearly polarized. As a result, a portion (e.g., half) of this unpolarized real-world image light passes through linear polarizer 66 and is received and imaged by camera (image sensor) 54.

If desired, optical combiner 34 may include a tunable tint layer. The tunable tint layer may impart global changes in light intensity to light passing through optical combiner 34 and/or may have pixelated regions that allow light intensity to be adjusted more granularly. Illustrative configurations of such as two-dimensional pixelated tunable tint layer may sometimes be described herein as an example.

Tunable tint layers may be based on guest-host liquid crystal devices and other liquid crystal components or other suitable light modulator devices. A cross-sectional side view of an illustrative tunable tint layer based on a non-guest-host liquid crystal device is shown in FIG. 6.

Figure 6:
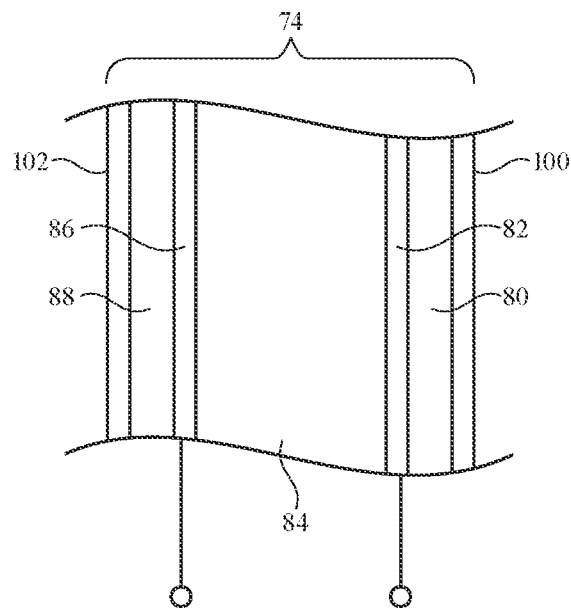
FIG. 6 is a cross-sectional side view of an illustrative tunable tint layer in accordance with an embodiment.

As shown in FIG. 6, tunable tint layer 74 may include transparent inner substrate 88 and transparent outer substrate 80. Substrates 80 and 88 may be formed from transparent materials such as glass, polymer, etc. Liquid crystal layer 84 may be interposed between substrate 80 and 88. Patterned transparent conductive electrodes 86 may be formed on the surfaces of substrates 80 and 88 that face liquid crystal layer 84. During operation, signals (voltages) may be applied to electrodes 86 and 82 to impart a desired pattern of electric fields across layer 84, thereby adjusting the optical properties of liquid crystal layer 84 (e.g., to locally rotate liquid crystals and thereby selectively adjust the polarization of light passing through layer 84). Liquid crystal layer 84 is interposed between front polarizer 100 and rear polarizer 102, so changes in the polarization state of light passing through layer 84 can be used to adjust the light transmission of that light and thereby selectively adjust the tint (light transmission level) of tunable tint layer 74. Polarizer layers 100 and 102 may be formed from layers that are on the inner and/or outer surfaces of substrates 88 and 80 and/or on other layers in combiner 34. In one illustrative configuration polarizer layer 102 includes a reflective polarizer and an optional clean-up linear polarizer.

Electrodes 82 and 86 may have any suitable patterns and may be formed from any suitable transparent conductive materials. For example, electrodes 82 and/or 86 may be formed from patches, strips, or blanket films of a transparent conductive material such as indium tin oxide. With another illustrative arrangement, wire grid polarizer structures (e.g., narrow wires of about 100 nm in width and about 100 nm in period) may be patterned to form electrodes. In this type of arrangement, the wire grid polarizer structures may serve both to form a polarizer layer such as polarizer layer 102 and to form a set of electrodes for tunable (adjustable) tint layer 74. Wire grid wires may also serve as a liquid crystal alignment layer.

Figure 7:
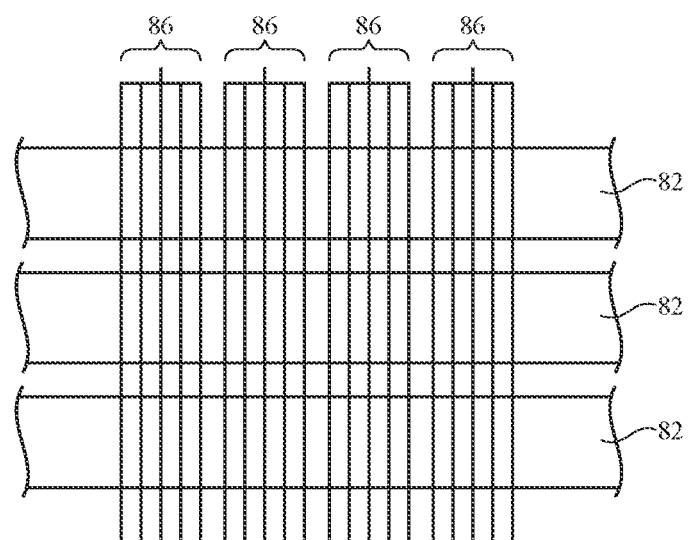
FIG. 7 is a front view of illustrative electrodes that may be used in a two-dimensional tunable tint layer in an optical system in accordance with an embodiment.

With one illustrative configuration, which is illustrated in FIG. 7, electrodes 86 are strip-shaped electrodes (columns) each of which includes multiple wires from a wire grid polarizer layer. Each wire may be formed from a narrow strip of metal or other conductor (e.g., a wire with a width of 10-200 nm, 50 nm, at least 20 nm, less than 100 nm, or other suitable width) and each wire may be spaced from the next with a period of 100 nm, at least 30 nm, at least 70 nm, less than 150 nm, less than 250 nm, or other suitable period.

Sets of adjacent wires in the wire grid polarizer may be shorted together by horizontal metal paths to form respective vertical electrode strips. Horizontal strip-shaped electrodes (rows) may be formed from respective strips of indium tin oxide or other conductive material (electrodes 82). If desired, both row electrodes (electrodes 82) and column electrodes (electrodes 86) may be formed from elongated rectangular strips of indium tin oxide or other conductive material. Electrodes with other patterns may also be used. The configuration of FIG. 7 is illustrative.

Figure 8:
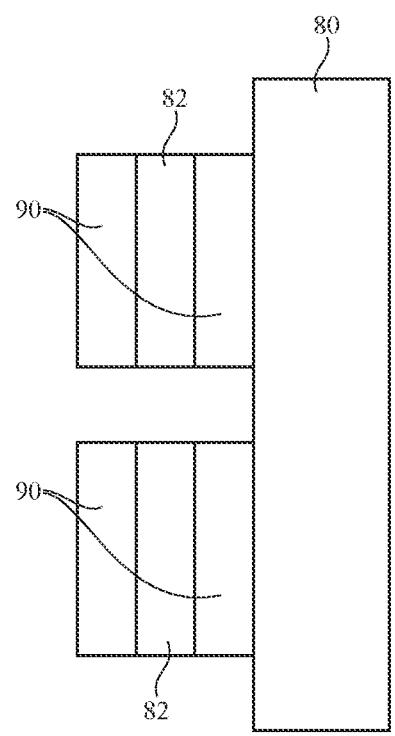
FIG. 8 is a cross-sectional side view of a substrate having electrodes and antireflection layers in accordance with an embodiment.

FIG. 8 is a cross-sectional side view of a portion of a tunable tint layer with indium tin oxide electrodes 82. As shown in FIG. 8, antireflection coating layers 90 (e.g., dielectric stacks forming thin-film interference filters such as stack 50 of FIG. 4) may be formed above and/or below each indium tin oxide electrode to reduce reflections from the electrode (e.g., reflections that might otherwise exist because of the relatively large index of refraction of the indium tin oxide material and the resulting large index mismatch between the indium tin oxide material and the glass or polymer of substrate 80). This approach may be used for electrodes 86 in configurations in which electrodes 86 are formed from indium tin oxide.

Figure 9:
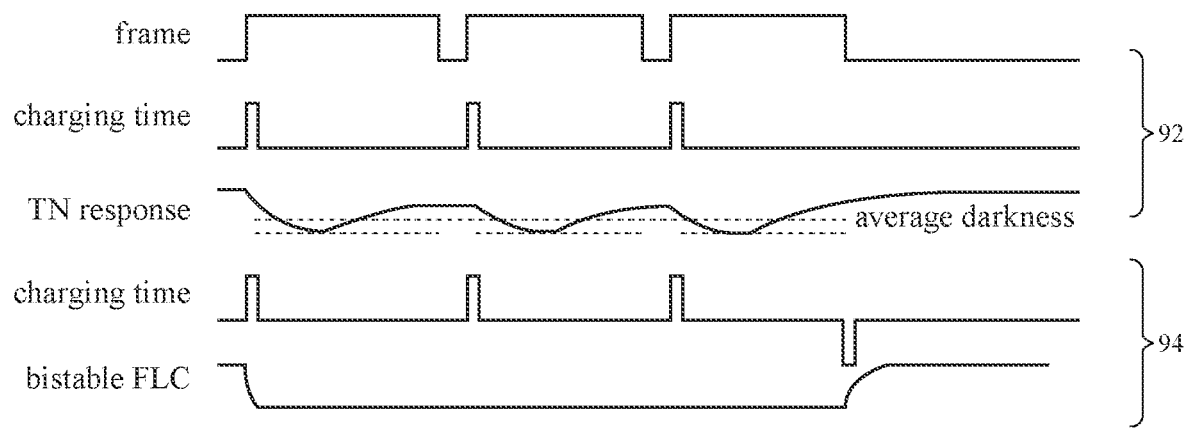
FIG. 9 is a graph showing illustrative arrangements for controlling liquid crystals in a tunable tint layer in accordance with embodiments.

FIG. 9 is a graph of illustrative control signals that may be applied the electrodes of tunable tint layer 74 by control circuitry 14 in equipment 10A and/or equipment 10B to adjust light transmission through optical coupler 34 in desired areas of coupler 34.

With one illustrative configuration, which is illustrated in connection with traces 92, liquid crystal layer 84 is a twisted nematic layer. The response (liquid crystal rotation) of the liquid crystals in layer 84 is time averaged. By varying the length of the control pulses applied in each frame and by selecting the location (e.g., the lateral position) of these control pulses (e.g., by adjusting the voltages across different portions of layer 84 by applying corresponding control signals appropriately to electrodes 82 and 86), the amount of liquid crystal rotation and therefore the amount of light polarization rotation that is achieved by layer 84 can be dynamically adjusted across the two-dimensional surface of tunable tint layer 74 and therefore optical combiner 34.

With another illustrative configuration, which is illustrated in connection with traces 94, liquid crystal layer 84 is formed from a bistable ferroelectric liquid crystal material. In this type of arrangement, the polarity of the control signals can be adjusted by control circuitry 14 when it is desired to change the state of liquid crystal layer 84 and thereby adjust the light polarization rotation properties of layer 84 (e.g., when it is desired to change the light transmission state of layer 74 in one or more locations across the surface of layer 74).

Figure 10:
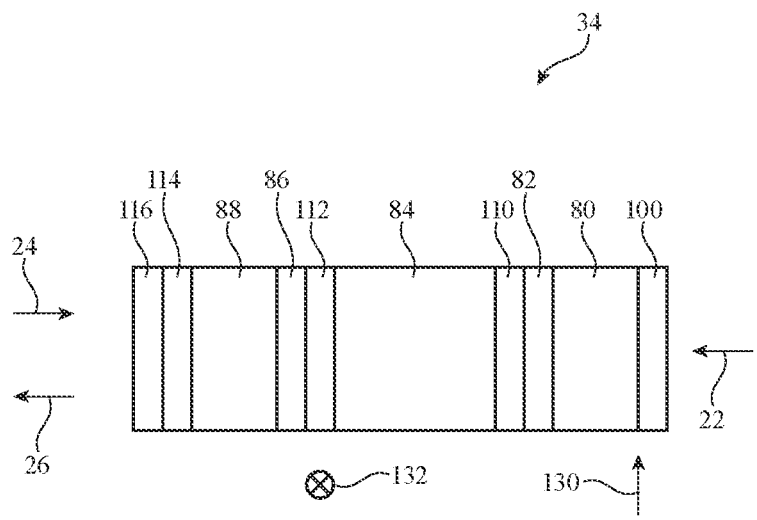
FIGS. 10 and 11 are cross-sectional side views of illustrative optical combiners with tunable tint layers in accordance with embodiments.
Figure 11:
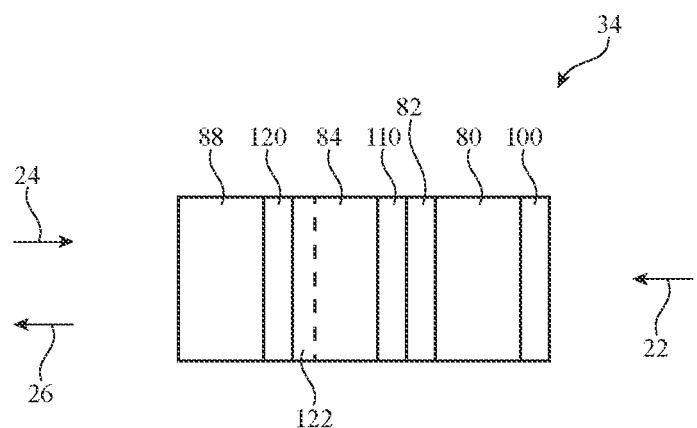

Cross-sectional side views of optical combiner 34 are shown in FIGS. 10 and 11.

In the illustrative configuration of FIG. 10, a tunable tint layer with a non-wire-grid reflective polarizer has been used in forming optical combiner 34. Combiner 34 may have linear polarizer 100 on the outer surface of substrate 80. As unpolarized real-world image light 22 passes through polarizer 100 it becomes linearly polarized (e.g., parallel to vertical direction 130). Electrodes 82 may be formed on the inner surface of substrate 80 and may be coated with a liquid crystal alignment layer such as polyimide layer 110. The outwardly facing surface of substrate 88 may be provided with corresponding electrodes 86 covered with a liquid crystal alignment layer such as polyimide layer 112. The orientations of layers 110 and 112 are configured to twist the liquid crystals in layer 84 so that in the absence of applied electric field across layer 84, linearly polarized real-world image light (e.g., light 22 that has passed through linear polarizer 100) will be rotated 90° in polarization so that this light is polarized along direction 132 (e.g., into the page of FIG. 10) as this light exits layer 84 towards the user.

Reflective polarizer 116 is oriented with its reflection axis along direction 130 and its transmission axis along direction 132. As a result, light 22 that has passed through portions of layer 84 with no applied electric field and that is therefore polarized along direction 132 will be transmitted to the user as part of light 26 (e.g., light transmission will be maximized in areas of combiner 34 with no applied electric field across liquid crystal layer 84). In areas of optical combiner 34 for which lower light transmission values are desired, control circuitry 14 may apply an electric field across layer 84 with electrodes 86 and 82. This changes the orientation of the liquid crystals in layer 84, changes the associated polarization of light 22 that has passed through layer 84 (e.g., so that this light is partially or fully polarized parallel to direction 130), and thereby causes some or all of this light to be absorbed in reflective polarizer 116 (e.g., light transmission for areas of combiner 34 with an electric field applied across layer 84 will be low).

Light 24 from display 28 is initially circularly polarized, as described in connection with FIG. 3. An optical layer (e.g., a linear polarizer or a quarter wave plate such as quarter wave plate 150 of FIG. 2) may be included on a substrate in portion 12G of housing 12 to convert the circularly polarized light 24 that is emitted from display 38 to linearly polarized light (e.g., light polarized along direction 130. This causes light 24 to reflect from reflective polarizer 116, which has its reflection axis parallel to direction 130. As a result, the reflected light 24 forms part of light 26 and is viewed by the user in eye boxes 30.

In a configuration of the type shown in FIG. 10, reflective polarizer 116 may be formed from a dielectric stack having odd layers of a first index of refraction interleaved with even birefringent dielectric layers. The birefringent dielectric layers may exhibit the first index of refraction in a first polarization direction and may exhibit a second index of refraction in a second polarization direction that is orthogonal to the first polarization direction. When light is oriented along the first polarization direction, the stack will not reflect the light. When light is oriented along the second polarization direction, the stack will form a thin-film interference filter mirror that reflects the light.

If desired, an optional clean-up polarizer layer such as linear polarizer 114 may be interposed between reflective polarizer layer 116 and substrate 88. Polarizer 114 may have a pass axis aligned with the pass axis of reflective polarizer 116 (e.g., along direction 132) and may help ensure that light polarized orthogonal to this pass axis is absorbed.

In the illustrative configuration of FIG. 11, the reflective polarizer (reflective polarizer 120) is formed using a wire grid polarizer. The wires of the wire grid polarizer may serve as a liquid crystal alignment layer, so polyimide layer 112 of FIG. 10 may, if desired, be omitted. The wires of the wire grid structure forming reflective polarizer 20 may also be patterned to form electrodes, as described in connection with electrodes 86 of FIG. 7, so electrode layer 86 of FIG. 10 can be omitted. If desired, separate electrodes 86 (e.g., indium tin oxide strips) may be added to combiner 34 of FIG. 11. In some arrangements, optional linear polarizer 114 (e.g., a clean-up polarizer) may be included (e.g., as layer 122) and/or a polyimide alignment layer may be included. The wire grid reflective polarizer arrangement of FIG. 11 is illustrative.

The foregoing is merely illustrative and various modifications can be made to the described embodiments. The foregoing embodiments may be implemented individually or in any combination.

What is claimed is:

1. Equipment operable to receive real-world image light from external real-world objects, comprising:
a housing configured to receive a removable electronic device with a display that has pixels configured to emit display image light, wherein the removable electronic device comprises wireless communications circuitry; and
an optical combiner configured to combine the display image light with the real-world image light, wherein the optical combiner comprises:
a reflective polarizer with a concave lens shape configured to reflect the display image light;
a liquid crystal layer configured to receive the real-world image light; and
electrodes configured to apply electric fields to the liquid crystal layer.

2. The equipment defined in claim 1 wherein the display image light emitted by the pixels comprises circularly polarized light and wherein the equipment further comprises a quarter wave plate configured to convert the circularly polarized light into linearly polarized light that reflects from the reflective polarizer.

3. The equipment defined in claim 2 wherein the removable electronic device comprises a cellular telephone, wherein the pixels are configured to form the display in the cellular telephone, and wherein the quarter wave plate is configured to overlap the display.

4. The equipment defined in claim 2 wherein the reflective polarizer comprises a stack of dielectric layers.

5. The equipment defined in claim 2 wherein the reflective polarizer comprises a wire grid polarizer.

6. The equipment defined in claim 5 wherein the wire grid polarizer comprises wires shorted together to form at least some of the electrodes.

7. The equipment defined in claim 2 further comprising a linear polarizer, wherein the liquid crystal layer is interposed between the reflective polarizer and the linear polarizer.

8. The equipment defined in claim 2 wherein the electrodes include first electrodes of transparent conductive material and second electrodes of transparent conductive material and wherein the liquid crystal layer is interposed between the first and second electrodes.

9. The equipment defined in claim 1 further comprising a first linear polarizer and a second linear polarizer, wherein the first linear polarizer is interposed between the liquid crystal layer and the reflective polarizer and wherein the liquid crystal layer is interposed between the first linear polarizer and the second linear polarizer.

10. The equipment defined in claim 1 wherein the reflective polarizer comprises a wire grid polarizer and wherein there are no polyimide liquid crystal alignment layers between the wire grid polarizer and the liquid crystal layer.

11. The equipment defined in claim 1 wherein the electrodes include strips of transparent conductive material and a polyimide alignment layer that covers the strips of transparent conductive material.

12. The equipment defined in claim 1 further comprising first and second transparent substrates, wherein the liquid crystal layer is interposed between the first and second transparent substrates, wherein the reflective polarizer is formed on a first side of the substrate and wherein the liquid crystal layer is on an opposing second side of the first substrate.

13. The equipment defined in claim 12 further comprising a linear polarizer, wherein the second substrate is interposed between the linear polarizer and the liquid crystal layer.

14. The equipment defined in claim 1 wherein the housing comprises a head-mountable housing.

15. The equipment defined in claim 14 further comprising:
communications circuitry configured to communicate with the removable electronic device;
a gaze tracking sensor; and
visual inertial odometry circuitry.

16. Equipment operable to receive real-world image light from external real-world objects, comprising:
a housing configured to receive a removable electronic device with a camera and a battery, wherein the removable electronic device has pixels configured to emit display image light; and
an optical combiner configured to combine the display image light with the real-world image light, wherein the optical combiner comprises a reflective polarizer with a concave lens shape configured to reflect the display image light.

17. The equipment defined in claim 16 wherein the housing comprises a head-mountable housing, the equipment further comprising:
a liquid crystal layer;
first and second electrodes, wherein the liquid crystal layer is interposed between the first and second electrodes; and
a linear polarizer, wherein the liquid crystal layer and the first and second electrodes are interposed between the linear polarizer and the reflective polarizer.

18. The equipment defined in claim 16, further comprising:
a circular polarizer coupled to the housing that is configured to overlap the camera in the removable electronic device wherein the circular polarizer does not overlap the pixels when the removable electronic device is received within the housing.

19. The equipment defined in claim 18 wherein the removable electronic device comprises a cellular telephone, wherein the pixels form a display on a front face of the cellular telephone, wherein the camera comprises a front-facing camera on the cellular telephone, and wherein the circular polarizer includes a quarter wave plate and a linear polarizer.

20. The equipment defined in claim 19 wherein the linear polarizer is interposed between the quarter wave plate and the front-facing camera.

21. Equipment operable to receive real-world image light from external real-world objects, comprising:
a housing configured to receive external equipment with a display that has pixels configured to emit display image light; and
an optical combiner configured to combine the display image light with the real-world image light, wherein the optical combiner comprises:
a reflective polarizer with a concave lens shape configured to reflect the display image light;
a liquid crystal layer configured to receive the real-world image light;
electrodes configured to apply electric fields to the liquid crystal layer; and a first linear polarizer and a second linear polarizer, wherein the first linear polarizer is interposed between the liquid crystal layer and the reflective polarizer and wherein the liquid crystal layer is interposed between the first linear polarizer and the second linear polarizer.

\* \* \* \* \*